United States Patent
Prahlad et al.

(10) Patent No.: US 9,639,529 B2
(45) Date of Patent: May 2, 2017

(54) METHOD AND SYSTEM FOR SEARCHING STORED DATA

(71) Applicant: CommVault Systems, Inc., Oceanport, NJ (US)

(72) Inventors: Anand Prahlad, Bangalore (IN); Srinivas Kavuri, Bangalore (IN); Rajiv Kottomtharayil, Marlboro, NJ (US); Arun Prasad Amarendran, Manalapan, NJ (US); Brian Brockway, Shrewsbury, NJ (US); Marcus S. Muller, Granville, OH (US); Andreas May, Marlboro, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 114 days.

(21) Appl. No.: 14/138,596

(22) Filed: Dec. 23, 2013

(65) Prior Publication Data

US 2014/0114940 A1    Apr. 24, 2014

Related U.S. Application Data

(63) Continuation of application No. 13/538,862, filed on Jun. 29, 2012, now Pat. No. 8,615,523, which is a (Continued)

(51) Int. Cl.
*G06F 17/30*    (2006.01)

(52) U.S. Cl.
CPC .. *G06F 17/30011* (2013.01); *G06F 17/30082* (2013.01); *G06F 17/30442* (2013.01); *G06F 17/30864* (2013.01)

(58) Field of Classification Search
CPC combination set(s) only.
See application file for complete search history.

(56) References Cited

U.S. PATENT DOCUMENTS

| | | |
|---|---|---|
| 4,686,620 A | 8/1987 | Ng |
| 4,995,035 A | 2/1991 | Cole et al. |

(Continued)

FOREIGN PATENT DOCUMENTS

| | | |
|---|---|---|
| EP | 0259912 A1 | 3/1988 |
| EP | 0405926 A2 | 1/1991 |

(Continued)

OTHER PUBLICATIONS

Partial International Search Results, mailed May 25, 2007, International Application No. PCT/US2006/045556, 2 pages.

(Continued)

*Primary Examiner* — Etienne Leroux

(57) ABSTRACT

A complete document management system is disclosed. Accordingly, systems and methods for managing data associated with a data storage component coupled to multiple computers over a network are disclosed. Systems and methods for managing data associated with a data storage component coupled to multiple computers over a network are further disclosed. Additionally, systems and methods for accessing documents available through a network, wherein the documents are stored on one or more data storage devices coupled to the network, are disclosed.

21 Claims, 11 Drawing Sheets

Related U.S. Application Data continuation of application No. 13/076,634, filed on Mar. 31, 2011, now Pat. No. 8,234,249, which is a continuation of application No. 12/058,589, filed on Mar. 28, 2008, now Pat. No. 7,937,365, which is a continuation of application No. 11/931,034, filed on Oct. 31, 2007, now abandoned.

(60) Provisional application No. 60/871,735, filed on Dec. 22, 2006.

(56) References Cited

U.S. PATENT DOCUMENTS

| | | | |
|---|---|---|---|
| 5,005,122 | A | 4/1991 | Griffin et al. |
| 5,093,912 | A | 3/1992 | Dong et al. |
| 5,133,065 | A | 7/1992 | Cheffetz et al. |
| 5,193,154 | A | 3/1993 | Kitajima et al. |
| 5,212,772 | A | 5/1993 | Masters |
| 5,226,157 | A | 7/1993 | Nakano et al. |
| 5,239,647 | A | 8/1993 | Anglin et al. |
| 5,241,668 | A | 8/1993 | Eastridge et al. |
| 5,241,670 | A | 8/1993 | Eastridge et al. |
| 5,276,860 | A | 1/1994 | Fortier et al. |
| 5,276,867 | A | 1/1994 | Kenley et al. |
| 5,287,500 | A | 2/1994 | Stoppani, Jr. |
| 5,321,816 | A | 6/1994 | Rogan et al. |
| 5,333,315 | A | 7/1994 | Saether et al. |
| 5,347,653 | A | 9/1994 | Flynn et al. |
| 5,410,700 | A | 4/1995 | Fecteau et al. |
| 5,448,724 | A | 9/1995 | Hayashi |
| 5,491,810 | A | 2/1996 | Allen |
| 5,495,607 | A | 2/1996 | Pisello et al. |
| 5,504,873 | A | 4/1996 | Martin et al. |
| 5,519,865 | A | 5/1996 | Kondo et al. |
| 5,544,345 | A | 8/1996 | Carpenter et al. |
| 5,544,347 | A | 8/1996 | Yanai et al. |
| 5,559,957 | A | 9/1996 | Balk |
| 5,590,318 | A | 12/1996 | Zbikowski et al. |
| 5,619,644 | A | 4/1997 | Crockett et al. |
| 5,623,679 | A | 4/1997 | Rivette et al. |
| 5,638,509 | A | 6/1997 | Dunphy et al. |
| 5,673,381 | A | 9/1997 | Huai et al. |
| 5,699,361 | A | 12/1997 | Ding et al. |
| 5,729,743 | A | 3/1998 | Squibb |
| 5,737,747 | A | 4/1998 | Vishlitzky et al. |
| 5,751,997 | A | 5/1998 | Kullick et al. |
| 5,758,359 | A | 5/1998 | Saxon |
| 5,761,677 | A | 6/1998 | Senator et al. |
| 5,764,972 | A | 6/1998 | Crouse et al. |
| 5,778,395 | A | 7/1998 | Whiting et al. |
| 5,812,398 | A | 9/1998 | Nielsen |
| 5,813,009 | A | 9/1998 | Johnson et al. |
| 5,813,017 | A | 9/1998 | Morris |
| 5,829,046 | A | 10/1998 | Tzelnic et al. |
| 5,832,510 | A | 11/1998 | Ito et al. |
| 5,875,478 | A | 2/1999 | Blumenau |
| 5,887,134 | A | 3/1999 | Ebrahim |
| 5,892,917 | A | 4/1999 | Myerson |
| 5,901,327 | A | 5/1999 | Ofek |
| 5,907,621 | A | 5/1999 | Bachman et al. |
| 5,918,232 | A | 6/1999 | Pouschine et al. |
| 5,924,102 | A | 7/1999 | Perks |
| 5,950,205 | A | 9/1999 | Aviani, Jr. |
| 5,953,721 | A | 9/1999 | Doi et al. |
| 5,974,563 | A | 10/1999 | Beeler, Jr. |
| 6,006,225 | A | 12/1999 | Bowman et al. |
| 6,021,415 | A | 2/2000 | Cannon et al. |
| 6,023,710 | A | 2/2000 | Steiner et al. |
| 6,026,414 | A | 2/2000 | Anglin |
| 6,052,735 | A | 4/2000 | Ulrich et al. |
| 6,061,692 | A | 5/2000 | Thomas et al. |
| 6,076,148 | A | 6/2000 | Kedem |
| 6,088,697 | A | 7/2000 | Crockett et al. |
| 6,092,062 | A | 7/2000 | Lohman et al. |
| 6,094,416 | A | 7/2000 | Ying |
| 6,112,221 | A * | 8/2000 | Bender et al. ................ 718/102 |
| 6,131,095 | A | 10/2000 | Low et al. |
| 6,131,190 | A | 10/2000 | Sidwell |
| 6,148,412 | A | 11/2000 | Cannon et al. |
| 6,154,787 | A | 11/2000 | Urevig et al. |
| 6,154,852 | A | 11/2000 | Amundson et al. |
| 6,161,111 | A | 12/2000 | Mutalik et al. |
| 6,167,402 | A | 12/2000 | Yeager |
| 6,175,829 | B1 | 1/2001 | Li et al. |
| 6,189,001 | B1 * | 2/2001 | McGovern et al. |
| 6,212,512 | B1 | 4/2001 | Barney et al. |
| 6,260,069 | B1 | 7/2001 | Anglin |
| 6,269,431 | B1 | 7/2001 | Dunham |
| 6,275,953 | B1 | 8/2001 | Vahalia et al. |
| 6,301,592 | B1 | 10/2001 | Aoyama et al. |
| 6,324,581 | B1 | 11/2001 | Xu et al. |
| 6,328,766 | B1 | 12/2001 | Long |
| 6,330,570 | B1 | 12/2001 | Crighton |
| 6,330,642 | B1 | 12/2001 | Carteau |
| 6,343,324 | B1 | 1/2002 | Hubis et al. |
| RE37,601 | E | 3/2002 | Eastridge et al. |
| 6,356,801 | B1 | 3/2002 | Goodman et al. |
| 6,374,336 | B1 | 4/2002 | Peters et al. |
| 6,389,432 | B1 | 5/2002 | Pothapragada et al. |
| 6,418,478 | B1 | 7/2002 | Ignatius et al. |
| 6,421,683 | B1 | 7/2002 | Lamburt |
| 6,421,711 | B1 | 7/2002 | Blumenau et al. |
| 6,421,779 | B1 | 7/2002 | Kuroda et al. |
| 6,430,575 | B1 | 8/2002 | Dourish et al. |
| 6,438,586 | B1 | 8/2002 | Hass et al. |
| 6,487,561 | B1 | 11/2002 | Ofek et al. |
| 6,487,644 | B1 | 11/2002 | Huebsch et al. |
| 6,499,026 | B1 | 12/2002 | Rivette et al. |
| 6,507,852 | B1 | 1/2003 | Dempsey et al. |
| 6,516,314 | B1 | 2/2003 | Birkler et al. |
| 6,519,679 | B2 | 2/2003 | Devireddy et al. |
| 6,538,669 | B1 | 3/2003 | Lagueux, Jr. et al. |
| 6,542,909 | B1 | 4/2003 | Tamer et al. |
| 6,542,972 | B2 | 4/2003 | Ignatius et al. |
| 6,564,228 | B1 | 5/2003 | O'Connor |
| 6,581,143 | B2 | 6/2003 | Gagne et al. |
| 6,625,623 | B1 | 9/2003 | Midgley et al. |
| 6,647,396 | B2 | 11/2003 | Parnell et al. |
| 6,658,436 | B2 | 12/2003 | Oshinsky et al. |
| 6,658,526 | B2 | 12/2003 | Nguyen et al. |
| 6,732,124 | B1 | 5/2004 | Koseki et al. |
| 6,763,351 | B1 | 7/2004 | Subramaniam et al. |
| 6,772,164 | B2 | 8/2004 | Reinhardt |
| 6,775,790 | B2 | 8/2004 | Reuter et al. |
| 6,785,864 | B1 | 8/2004 | Te et al. |
| 6,834,329 | B2 | 12/2004 | Sasaki et al. |
| 6,836,779 | B2 | 12/2004 | Poulin |
| 6,847,984 | B1 | 1/2005 | Midgley et al. |
| 6,857,053 | B2 | 2/2005 | Bolik et al. |
| 6,871,163 | B2 | 3/2005 | Hiller et al. |
| 6,886,020 | B1 | 4/2005 | Zahavi et al. |
| 6,947,935 | B1 | 9/2005 | Horvitz et al. |
| 6,983,322 | B1 | 1/2006 | Tripp et al. |
| 6,996,616 | B1 | 2/2006 | Leighton et al. |
| 7,003,519 | B1 | 2/2006 | Biettron et al. |
| 7,035,880 | B1 | 4/2006 | Crescenti et al. |
| 7,047,236 | B2 | 5/2006 | Conroy et al. |
| 7,085,787 | B2 | 8/2006 | Beier et al. |
| 7,103,740 | B1 | 9/2006 | Colgrove et al. |
| 7,130,860 | B2 | 10/2006 | Pachet et al. |
| 7,130,970 | B2 | 10/2006 | Devassy et al. |
| 7,146,566 | B1 * | 12/2006 | Hohensee et al. ............ 715/209 |
| 7,149,750 | B2 | 12/2006 | Chadwick |
| 7,165,082 | B1 | 1/2007 | DeVos |
| 7,167,895 | B1 | 1/2007 | Connelly |
| 7,171,619 | B1 | 1/2007 | Bianco |
| 7,181,444 | B2 | 2/2007 | Porter et al. |
| 7,194,454 | B2 | 3/2007 | Hansen et al. |
| 7,197,502 | B2 | 3/2007 | Feinsmith |
| 7,200,726 | B1 | 4/2007 | Gole et al. |
| 7,240,100 | B1 | 7/2007 | Wein et al. |
| 7,246,207 | B2 | 7/2007 | Kottomtharayil et al. |
| 7,246,211 | B1 | 7/2007 | Beloussov et al. |
| 7,269,612 | B2 | 9/2007 | Devarakonda et al. |

(56) References Cited

U.S. PATENT DOCUMENTS

| | | | |
|---|---|---|---|
| 7,272,606 B2 | 9/2007 | Borthakur et al. |
| 7,330,997 B1 | 2/2008 | Odom |
| 7,343,365 B2 | 3/2008 | Farnham et al. |
| 7,346,623 B2 | 3/2008 | Prahlad et al. |
| 7,346,676 B1 | 3/2008 | Swildens et al. |
| 7,356,657 B2 | 4/2008 | Mikami |
| 7,356,660 B2 | 4/2008 | Matsunami et al. |
| 7,359,917 B2 | 4/2008 | Winter et al. |
| 7,366,859 B2 | 4/2008 | Per et al. |
| 7,386,663 B2 | 6/2008 | Cousins |
| 7,395,282 B1 | 7/2008 | Crescenti et al. |
| 7,430,587 B2 | 9/2008 | Malone et al. |
| 7,433,301 B2 | 10/2008 | Akahane et al. |
| 7,440,966 B2 | 10/2008 | Adkins et al. |
| 7,440,984 B2 | 10/2008 | Augenstein et al. |
| 7,454,569 B2 | 11/2008 | Kavuri et al. |
| 7,496,589 B1 | 2/2009 | Jain et al. |
| 7,500,150 B2 | 3/2009 | Sharma et al. |
| 7,509,316 B2 | 3/2009 | Greenblatt et al. |
| 7,512,601 B2 | 3/2009 | Cucerzan et al. |
| 7,512,814 B2 | 3/2009 | Chen et al. |
| 7,529,748 B2 | 5/2009 | Wen et al. |
| 7,532,340 B2 | 5/2009 | Koppich et al. |
| 7,533,103 B2 | 5/2009 | Brendle et al. |
| 7,533,181 B2 | 5/2009 | Dawson et al. |
| 7,533,230 B2 | 5/2009 | Glover et al. |
| 7,583,861 B2 | 9/2009 | Hanna et al. |
| 7,584,227 B2 | 9/2009 | Gokhale et al. |
| 7,590,997 B2 | 9/2009 | Diaz Perez |
| 7,613,728 B2 | 11/2009 | Png et al. |
| 7,613,752 B2 | 11/2009 | Prahlad et al. |
| 7,617,541 B2 | 11/2009 | Plotkin et al. |
| 7,620,710 B2 | 11/2009 | Kottomtharayil et al. |
| 7,624,443 B2 | 11/2009 | Kramer et al. |
| 7,627,598 B1 | 12/2009 | Burke |
| 7,627,617 B2 | 12/2009 | Kavuri et al. |
| 7,631,151 B2 | 12/2009 | Prahlad et al. |
| 7,634,478 B2 | 12/2009 | Yang et al. |
| 7,657,550 B2 | 2/2010 | Prahlad et al. |
| 7,660,800 B2 | 2/2010 | Prahlad et al. |
| 7,660,807 B2 | 2/2010 | Prahlad et al. |
| 7,668,798 B2 | 2/2010 | Scanlon et al. |
| 7,668,884 B2 | 2/2010 | Prahlad et al. |
| 7,672,962 B2 | 3/2010 | Arrouye et al. |
| 7,693,856 B2 | 4/2010 | Arrouye et al. |
| 7,707,178 B2 | 4/2010 | Prahlad et al. |
| 7,711,700 B2 | 5/2010 | Prahlad et al. |
| 7,716,171 B2 | 5/2010 | Kryger |
| 7,716,191 B2 | 5/2010 | Blumenau et al. |
| 7,720,801 B2 | 5/2010 | Chen |
| 7,725,605 B2 | 5/2010 | Palmeri et al. |
| 7,725,671 B2 | 5/2010 | Prahlad et al. |
| 7,734,593 B2 | 6/2010 | Prahlad et al. |
| 7,734,669 B2 | 6/2010 | Kottomtharayil et al. |
| 7,734,715 B2 | 6/2010 | Hyakutake et al. |
| 7,747,579 B2 | 6/2010 | Prahlad et al. |
| 7,756,837 B2 | 7/2010 | Williams et al. |
| 7,801,864 B2 | 9/2010 | Prahlad et al. |
| 7,809,687 B2 * | 10/2010 | Cisler et al. | 707/654 |
| 7,818,215 B2 | 10/2010 | King et al. |
| 7,822,749 B2 | 10/2010 | Prahlad et al. |
| 7,831,553 B2 | 11/2010 | Prahlad et al. |
| 7,831,622 B2 | 11/2010 | Prahlad et al. |
| 7,831,795 B2 | 11/2010 | Prahlad et al. |
| 7,840,537 B2 | 11/2010 | Gokhale et al. |
| 7,840,619 B2 | 11/2010 | Horn |
| 7,841,011 B2 | 11/2010 | Manson et al. |
| 7,849,059 B2 | 12/2010 | Prahlad et al. |
| 7,882,077 B2 | 2/2011 | Gokhale et al. |
| 7,882,098 B2 | 2/2011 | Prahlad et al. |
| 7,890,467 B2 | 2/2011 | Watanabe et al. |
| 7,890,469 B1 | 2/2011 | Maionchi et al. |
| 7,925,856 B1 | 4/2011 | Greene |
| 7,933,920 B2 | 4/2011 | Kojima et al. |
| 7,937,365 B2 | 5/2011 | Prahlad et al. |
| 7,937,393 B2 | 5/2011 | Prahlad et al. |
| 7,962,709 B2 | 6/2011 | Agrawal |
| 7,966,495 B2 | 6/2011 | Ackerman et al. |
| 8,010,769 B2 | 8/2011 | Prahlad et al. |
| 8,037,031 B2 | 10/2011 | Gokhale et al. |
| 8,041,677 B2 | 10/2011 | Sumner et al. |
| 8,051,045 B2 | 11/2011 | Vogler |
| 8,051,095 B2 | 11/2011 | Prahlad et al. |
| 8,055,650 B2 | 11/2011 | Scanlon et al. |
| 8,055,745 B2 | 11/2011 | Atluri |
| 8,086,569 B2 | 12/2011 | Jasrasaria |
| 8,117,196 B2 | 2/2012 | Jones et al. |
| 8,140,786 B2 | 3/2012 | Bunte et al. |
| 8,170,995 B2 | 5/2012 | Prahlad et al. |
| 8,190,571 B2 | 5/2012 | Sen et al. |
| 8,219,524 B2 | 7/2012 | Gokhale |
| 8,229,954 B2 | 7/2012 | Kottomtharayil et al. |
| 8,234,249 B2 | 7/2012 | Prahlad et al. |
| 8,271,548 B2 | 9/2012 | Prahlad et al. |
| 8,285,964 B2 | 10/2012 | Prahlad et al. |
| 8,401,996 B2 | 3/2013 | Muller et al. |
| 8,442,983 B2 | 5/2013 | Pawar |
| 2001/0047365 A1 | 11/2001 | Yonaitis |
| 2002/0049626 A1 | 4/2002 | Mathias et al. |
| 2002/0069324 A1 | 6/2002 | Gerasimov et al. |
| 2002/0087550 A1 | 7/2002 | Carlyle et al. |
| 2002/0118974 A1 * | 8/2002 | Ikeda | 399/8 |
| 2002/0147734 A1 | 10/2002 | Shoup et al. |
| 2002/0161753 A1 | 10/2002 | Inaba et al. |
| 2003/0018607 A1 | 1/2003 | Lennon et al. |
| 2003/0046313 A1 | 3/2003 | Leung et al. |
| 2003/0055828 A1 * | 3/2003 | Koch | G06F 17/241 |
| 2003/0101183 A1 | 5/2003 | Kabra et al. |
| 2003/0130993 A1 | 7/2003 | Mendelevitch et al. |
| 2003/0182583 A1 | 9/2003 | Turco |
| 2003/0196052 A1 | 10/2003 | Bolik et al. |
| 2004/0015514 A1 | 1/2004 | Melton et al. |
| 2004/0254919 A1 | 12/2004 | Giuseppini |
| 2004/0260678 A1 | 12/2004 | Verbowski et al. |
| 2004/0260973 A1 | 12/2004 | Michelman |
| 2005/0010588 A1 | 1/2005 | Zalewski et al. |
| 2005/0050075 A1 | 3/2005 | Okamoto et al. |
| 2005/0055352 A1 | 3/2005 | White et al. |
| 2005/0055386 A1 | 3/2005 | Tosey |
| 2005/0086231 A1 | 4/2005 | Moore |
| 2005/0114381 A1 | 5/2005 | Borthakur et al. |
| 2005/0154695 A1 | 7/2005 | Gonzalez et al. |
| 2005/0166082 A1 | 7/2005 | Williams et al. |
| 2005/0187937 A1 | 8/2005 | Kawabe et al. |
| 2005/0188248 A1 | 8/2005 | O'Brien et al. |
| 2005/0216453 A1 | 9/2005 | Sasaki et al. |
| 2005/0228794 A1 | 10/2005 | Navas et al. |
| 2005/0262097 A1 | 11/2005 | Sim-Tang et al. |
| 2006/0004820 A1 | 1/2006 | Claudatos et al. |
| 2006/0015524 A1 | 1/2006 | Gardiner et al. |
| 2006/0047714 A1 * | 3/2006 | Anderson et al. | 707/202 |
| 2006/0101285 A1 | 5/2006 | Chen et al. |
| 2006/0173870 A1 * | 8/2006 | Erdmenger et al. | 707/100 |
| 2006/0224846 A1 | 10/2006 | Amarendran et al. |
| 2006/0259468 A1 | 11/2006 | Brooks et al. |
| 2006/0259527 A1 | 11/2006 | Devarakonda et al. |
| 2006/0277154 A1 | 12/2006 | Lunt et al. |
| 2007/0033191 A1 | 2/2007 | Hornkvist et al. |
| 2007/0043956 A1 | 2/2007 | El Far et al. |
| 2007/0067304 A1 | 3/2007 | Ives |
| 2007/0100867 A1 | 5/2007 | Celik et al. |
| 2007/0143559 A1 * | 6/2007 | Yagawa | 711/170 |
| 2007/0185926 A1 | 8/2007 | Prahlad et al. |
| 2007/0203938 A1 | 8/2007 | Prahlad et al. |
| 2007/0206205 A1 * | 9/2007 | Suzuki | 358/1.1 |
| 2007/0282680 A1 | 12/2007 | Davis et al. |
| 2008/0059495 A1 | 3/2008 | Kiessig et al. |
| 2008/0059515 A1 | 3/2008 | Fulton |
| 2008/0077594 A1 | 3/2008 | Ota |
| 2008/0091747 A1 | 4/2008 | Prahlad et al. |
| 2008/0183662 A1 | 7/2008 | Reed et al. |
| 2008/0228771 A1 | 9/2008 | Prahlad et al. |
| 2009/0172333 A1 | 7/2009 | Marcu et al. |
| 2009/0287665 A1 | 11/2009 | Prahlad et al. |

(56) References Cited

U.S. PATENT DOCUMENTS

| | | |
|---|---|---|
| 2009/0319534 A1 | 12/2009 | Gokhale |
| 2010/0057870 A1 | 3/2010 | Ahn et al. |
| 2010/0082672 A1 | 4/2010 | Kottomtharayil et al. |
| 2010/0179941 A1 | 7/2010 | Agrawal et al. |
| 2010/0205150 A1 | 8/2010 | Prahlad et al. |
| 2010/0299490 A1 | 11/2010 | Attarde et al. |
| 2011/0178986 A1 | 7/2011 | Prahlad et al. |
| 2011/0181383 A1 | 7/2011 | Lotfi et al. |
| 2012/0215745 A1 | 8/2012 | Prahlad et al. |
| 2012/0254115 A1 | 10/2012 | Varadharajan |
| 2012/0271832 A1 | 10/2012 | Prahlad et al. |
| 2013/0013609 A1 | 1/2013 | Prahlad et al. |
| 2013/0110790 A1 | 5/2013 | Matsumoto et al. |
| 2013/0151640 A1 | 6/2013 | Ahn et al. |
| 2013/0198221 A1 | 8/2013 | Roark et al. |
| 2013/0246485 A1 | 9/2013 | Pawar |

FOREIGN PATENT DOCUMENTS

| | | |
|---|---|---|
| EP | 0467546 A2 | 1/1992 |
| EP | 0774715 A1 | 5/1997 |
| EP | 0809184 A1 | 11/1997 |
| EP | 0899662 A1 | 3/1999 |
| EP | 0981090 A1 | 2/2000 |
| EP | 1174795 | 1/2002 |
| WO | WO-9412944 A1 | 6/1994 |
| WO | WO-9513580 A1 | 5/1995 |
| WO | WO-9912098 A1 | 3/1999 |
| WO | WO-9914692 A1 | 3/1999 |
| WO | WO-0106368 A1 | 1/2001 |
| WO | WO-0193537 A2 | 12/2001 |
| WO | WO-03060774 A1 | 7/2003 |
| WO | WO-2004010375 A2 | 1/2004 |
| WO | WO-2004063863 A3 | 3/2005 |
| WO | WO-2005055093 A2 | 6/2005 |
| WO | WO-2007062254 A2 | 5/2007 |
| WO | WO-2007062429 A2 | 5/2007 |
| WO | WO-2008049023 A2 | 4/2008 |

OTHER PUBLICATIONS

"Text Figures", retrieved from http://www.microsoft.com/msj/1198.ntfs/ntfstextfigs.htm on Nov. 10, 2005, 7 pages.
Farley, M., "Storage Network Fundamentals Network Backup: The Foundation of Storage Management, Data Management," Storage Networking Fundamentals: an Introduction to Storage Devices, Subsystems, Applications, Management, and Filing [File] Systems, Cisco Press, Jan. 1, 2005, 9 pages.
EMC Corporation, "Today's Choices for Business Continuity," 2004, 12 pages.
Microsoft Developer Network, "Win32_File_Attribute_Data," online library article, [accessed on Nov. 10, 2005], 3 pages.
Microsoft Developer Network, "GetFileAttributesEx," online library article, [accessed on Nov. 10, 2005], 2 pages.
Microsoft Developer Network, "GetFileAttributes," online library article, [accessed on Nov. 10, 2005], 3 pages.
Jeffrey Cooperstein and Jeffrey Richter, "Keeping an Eye on Your NTFS Drives: the Windows 2000 Change Journal Explained," Microsoft Systems Journal, Sep. 1999, 17 pages.
Jeffrey Cooperstein and Jeffrey Richter, "Keeping an Eye on Your NTFS Drives, Part II: Building a Change Journal Application," Microsoft Systems Journal, Oct. 1999, 14 pages.
Karl Langdon and John Merryman, "Data Classification: Getting Started," Storage Magazine, Jul. 2005, 3 pages.
Jeffrey Richter and Luis Felipe Cabrera, "A File System for the 21st Century: Previewing the Windows NT 5.0 File System," and attached text figures, Microsoft Systems Journal, Nov. 1998, 24 pages.
Arneson, David A., "Development of Omniserver," Control Data Corporation, Tenth IEEE Symposium on Mass Storage Systems, May 1990, 'Crisis in Mass Storage' Digest of Papers, pp. 88-93, Monterey, CA.
Bowman et al. "Harvest: A Scalable, Customizable Discovery and Access System," Department of Computer Science, University of Colorado—Boulder, Revised Mar. 1995, 29 pages.
Manber et al., "WebGlimpse—Combining Browsing and Searching," 1997 Usenix Technical Conference, Jan. 1997, 12 pages.
Eitel, "Backup and Storage Management in Distributed Heterogeneous Environments," *IEEE*, Jun. 12-16, 1994, pp. 124-126.
International Search Report and Written Opinion for International Application No. PCT/US10/62069, Mail Date Mar. 7, 2011, 7 pages.
Supplementary European Search Report for European Application No. EP07844364, Mail Date Apr. 19, 2011, 9 pages.
"Titus Labs—Announces Document Classification for Microsoft Word" Nov. 3, 2005 (Nov. 3, 2005), XP55034835, available at http://web.archive.org/web/20051126093136/http://www.titus-labs.com/about/DocClassRelease.html, 1 page.
Extended European Search Report for European Application No. EP11003795, Mail Date Nov. 21, 2012, 20 pages.
Harrison, CDIA Training & Test Preparation Guide 2000, Specialized Solutions, 3 pages.
Quick Reference Guide for West and EAST [date unknown, but verified as of Sep. 13, 2007], Search and Information Resource Administration, 2 pages.
User's Manual for the Examiners Automated Search Tool (EAST) Jul. 22, 1999, Version 1.0, 179 pages.
Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.
Armstead et al., "Implementation of a Campus-wide Distributed Mass Storage Service: The Dream vs. Reality," *IEEE*, Sep. 11-14, 1995, pp. 190-199.
Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.
Jander, M., "Launching Storage-Area Net," *Data Communications*, US, McGraw Hill, NY, vol. 27, No. 4 (Mar. 21, 1998), pp. 64-72.
Gait, J., "The Optical File Cabinet: A Random-Access File System for Write-Once Optical Disks," *IEEE Computer*, vol. 21, No. 6, pp. 11-22 (Jun. 1988).
Rosenblum et al., "The Design and Implementation of a Log-Structured File System," *Operating Systems Review SIGOPS*, vol. 25, No. 5, New York, US, pp. 1-15 (May 1991).
Bhagwan, R. et al. "Total Recall: System Support for Automated Availability Management," Proceedings of the 1st Conference on Symposium on Networked Systems Design and Implementation, vol. 1, Mar. 3, 2004, XP055057350, Berkeley, CA, 14 pages.
International Search Report and Written Opinion for International Application No. PCT/US07/81681, Mail Date Oct. 20, 2008, 11 pages.
International Search Report and Written Opinion for International Application No. PCT/US07/81681, Mail Date Nov. 13, 2009, 8 pages.
O'Neill, B., "New Tools to Classify Data," Storage Magazine, Aug. 2005, 4 pages.
Titus Labs Document Classification V1.1 for Microsoft Word—Document Policy Enforcement, available at: <http://web.archive.org/web/20060104112621/www.titus-labs.com/includes/PDF/DocClassDataSheet.pdf>, Nov. 3, 2005, 2 pages.
Extended European Search Report for European Application No. 07855337.7, Mail Date Dec. 9, 2010, 6 pages.

\* cited by examiner

METHOD AND SYSTEM FOR SEARCHING STORED DATA

CROSS-REFERENCE TO RELATED APPLICATION

This application is a continuation of U.S. application Ser. No. 13/538,862, filed Jun. 29, 2012 (now U.S. Pat. No. 8,615,523), which is a continuation application of U.S. application Ser. No. 13/076,634, filed Mar. 31, 2011 (now U.S. Pat. No. 8,234,249), which is a continuation application of U.S. application Ser. No. 12/058,589, filed Mar. 28, 2008 (now U.S. Pat. No. 7,937,365), which is a continuation application of U.S. application Ser. No. 11/931,034, filed Oct. 31, 2007, which claims priority to U.S. Provisional Application No. 60/871,735, filed Dec. 22, 2006, each of which is herein incorporated by reference in its entirety.

BACKGROUND

Data protection systems contain large amounts of data. This data includes personal data, such as financial data, customer/client/patient contact data, audio/visual data, and much more. Corporate computer systems often contain word processing documents, engineering diagrams, spreadsheets, business strategy presentations, and so on. With the proliferation of computer systems and the ease of creating content, the amount of content in an organization has expanded rapidly. Even small offices often have more information stored than any single employee can know about or locate.

Some data protection applications provide functions for actively searching for files within the organization based on a previously created index of the information available in each file. A user can then search for and retrieve documents based on a topic. Typical search software operates on a single index of keywords derived from the data that has been copied for protection purposes. It is typical for an organization to maintain many secondary copies of its data and the various copies are typically stored in multiple formats in multiple devices. For example, when current copy of data is made, previous copies are often maintained so that an historical archive is created. Thus, if the most recent copy does not have the desired data for a restore operation, an older copy may be used. With the existence of multiple copies on multiple devices spanning weeks, months and even years, a search over this data can be complex and time consuming. A search over such a large amount of data can require separately searching content indices of all of the computer systems within an organization. This can put an unexpected load on already burdened systems and can require significant time on the part of a system operator.

Typical search systems also create problems when retrieval of the desired data is attempted. First, typical systems require that retrieval of the identified data be performed as a restore operation. The typical restore operation first identifies a secondary copy of the data in question on a secondary volume and copies the identified copy of the data back onto a production server (or other primary or working volume) and overwrites the existing data files. This can be inconvenient if it is desired to maintain the production copy or if it is merely desired to inspect the contents of a secondary data store. Second, typical systems are blind to the security rights of users and database operators. Typical systems do not have an integrated data rights security control that identifies the security privileges of the operator or user for whom the data is being restored and allows or denies the restore accordingly. Additionally, typical systems do not allow a user to promote and reapply search criteria throughout the data management system.

BRIEF DESCRIPTION OF THE DRAWINGS

In the drawings, the same reference numbers and acronyms identify elements or acts with the same or similar functionality for ease of understanding and convenience.

DETAILED DESCRIPTION

The invention will now be described with respect to various examples. The following description provides specific details for a thorough understanding of, and enabling description for, these examples of the invention. However, one skilled in the art will understand that the invention may be practiced without these details. In other instances, well-known structures and functions have not been shown or described in detail to avoid unnecessarily obscuring the description of the examples of the invention.

The terminology used in the description presented below is intended to be interpreted in its broadest reasonable manner, even though it is being used in conjunction with a detailed description of certain specific examples of the invention. Certain terms may even be emphasized below; however, any terminology intended to be interpreted in any restricted manner will be overtly and specifically defined as such in this Detailed Description section.

Figure 1:
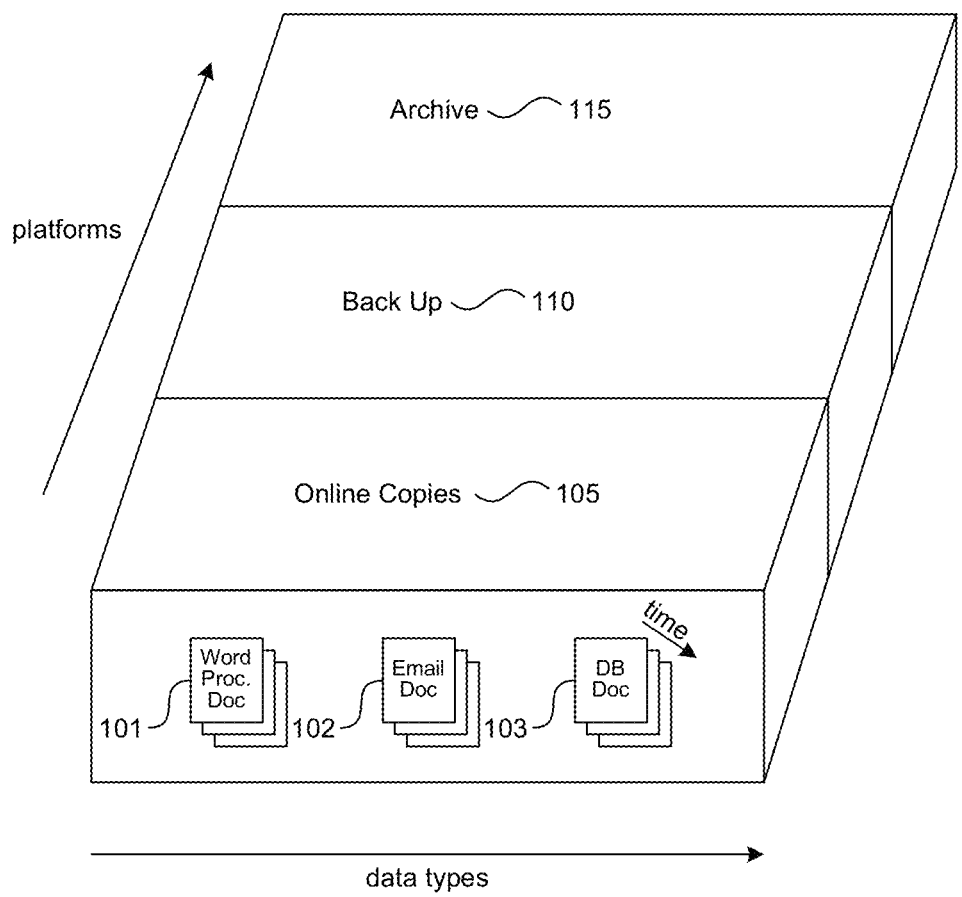
FIG. 1 illustrates an example of a group of platforms and data types for searching.

FIG. 1 illustrates a summary example of a group of platforms and data types that can be searched. As illustrated and as described in more detail herein, a search can be performed over any platform, over any data type, and for documents having been created over any period of time. As illustrated, the system described herein can operate to archive and search data files including, for example, word processing documents 101, email correspondence 102, and database files 103. These files and documents can exist as online copies 105, backup copies 110, and archive copies 115. Thus, the systems and methods described herein can be used to search for and locate virtually any document that has ever existed on an institutional system, whether it currently exists or existed at any time in the past. These various data types and platform types can coexist in and be operated on in a hierarchical data storage system.

Suitable System

Figure 2:
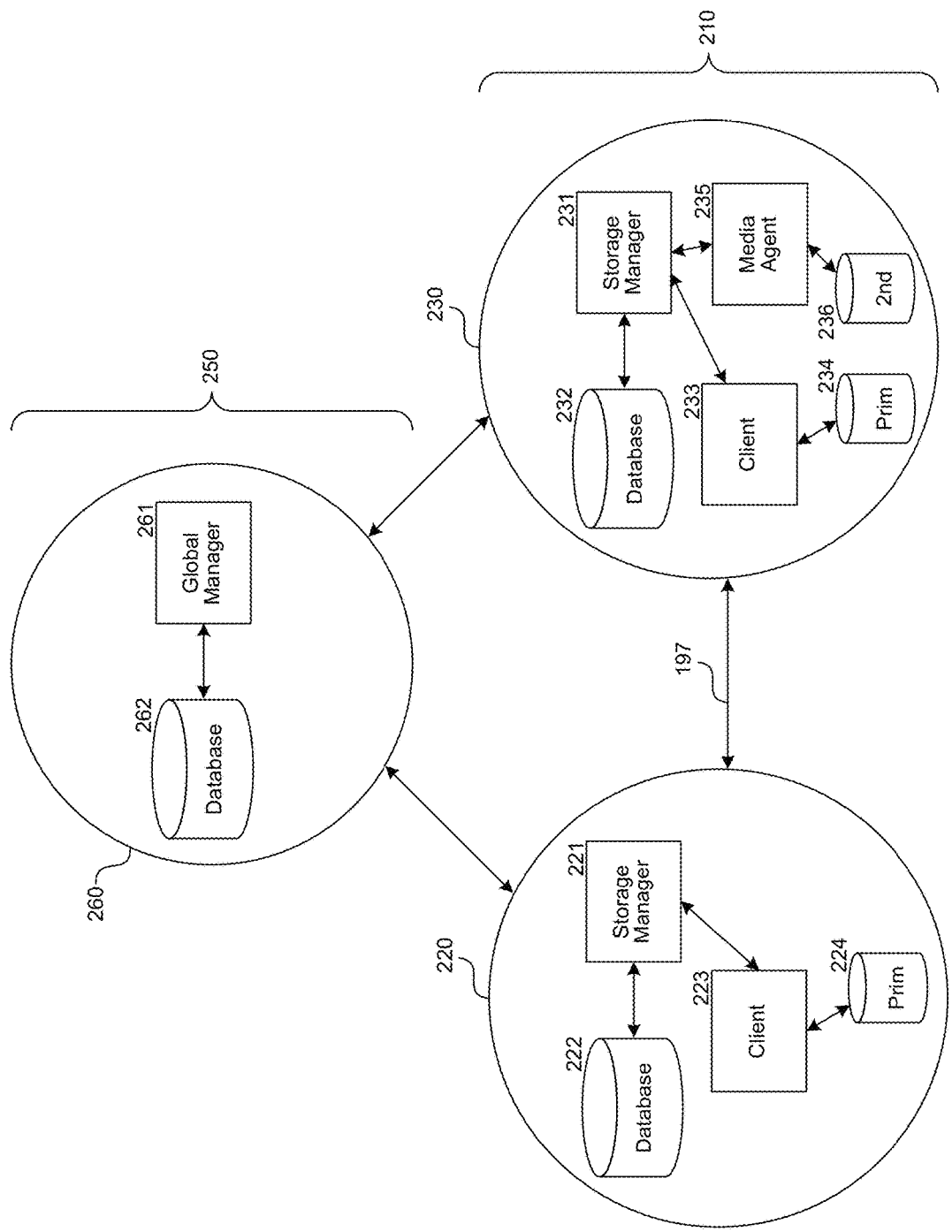
FIG. 2 is a block diagram that illustrates a hierarchical data storage system.

Referring to FIG. 2, a block diagram illustrating a hierarchical data storage system comprises two levels: a storage operations level 210 and a global level 250. The global level 250 may contain a global operations cell 260, which may contain a global manager 261 and a database 262. The storage operations level 210 may contain storage operations cells, such as cells 220 and 230. Cells 220 and 230 may perform specified data storage operations, or may perform varied data storage operations that depend on the needs of the system.

Cell 220 contains components used in data storage operations, such as a storage manager 221, a database 222, a client 223, and a primary storage database 224. Cell 230 may contain similar components, such as storage manager 231, a database 232, a client 233, and a primary storage database 234. In this example, cell 230 also contains media agent 235 and secondary database 236. Both cells 220 and 230 communicate with global manager 260, providing information related to the data storage operations of their respective cells.

Figure 3:
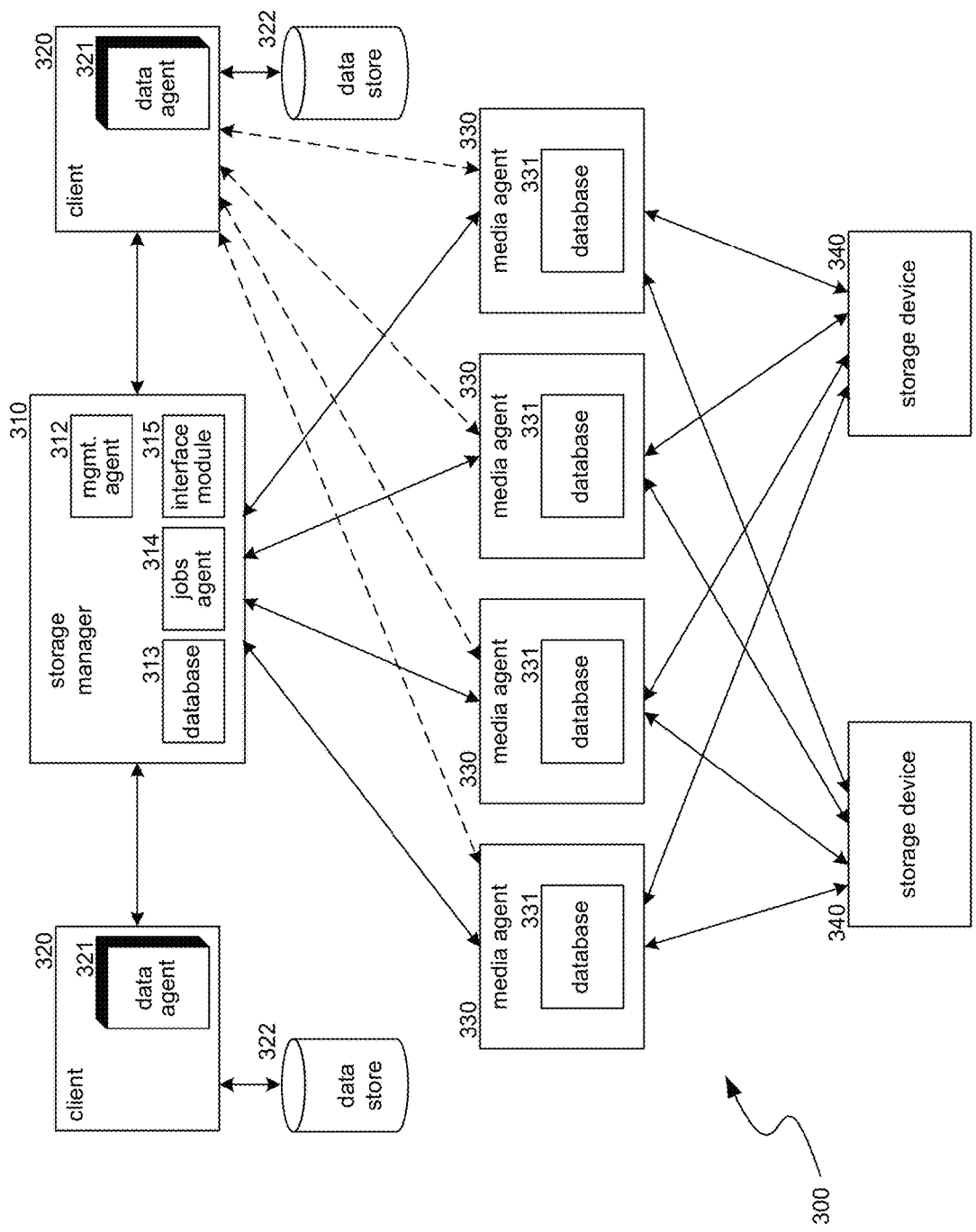
FIG. 3 is a block diagram that illustrates components of a storage operations cell.

Referring to FIG. 3, a block diagram illustrating components of a storage operations cell is shown. Storage operations cells (such as cells 220 or 230 of FIG. 2) may contain some or all of the following components, depending on the use of the cell and the needs of the system. For example, cell 300 contains a storage manager 310, clients 320, multiple media agents 330, and multiple storage devices 340. Storage manager 310 controls media agents 330, which are responsible, at least in part, for transferring data to storage devices 340. Storage manager 310 includes a jobs agent 311, a management agent 312, a database 313, and an interface module 314. Storage manager 310 communicates with client 320. Client 320 accesses data to be stored by the system from database 322 via a data agent 321. The system uses media agents 330, which contain databases 331, to transfer and store data into storage devices 340.

Cells 300 may include software and/or hardware components and modules used in data storage operations. The cells 300 may be transfer cells that function to transfer data during data store operations. The cells 300 may perform other storage operations in addition to operations used in data transfers. For example, cells 300 may perform creating, storing, retrieving, and/or migrating primary and secondary data copies. The data copies may include snapshot copies, secondary copies, hierarchical storage manager copies, archive copies, and so on. The cells 300 may also perform storage management functions that may push information to higher level cells, including global manager cells.

In some embodiments, the system can be configured to perform a storage operation based on one or more storage policies. A storage policy may be, for example, a data structure that includes a set of preferences or other criteria considered during storage operations. The storage policy may determine or define a storage location, a relationship between components, network pathways, accessible datapipes, retention schemes, compression or encryption requirements, preferred components, preferred storage devices or media, and so on. Storage policies may be stored in storage manager 310, 221, 231, or may be stored in global manager 261, as discussed above.

Additionally or alternatively, the system may implement or utilize schedule policies. A schedule policy may specify when to perform storage operations, how often to perform storage operations, and so on. The schedule policy may also define the use of sub-clients, where one type of data (such as email data) is stored using one sub-client, and another type of data (such as database data) is stored using another sub-client. In these cases, storage operations related to specific data types (email, database, and so on) may be distributed between cells.

Figure 4:
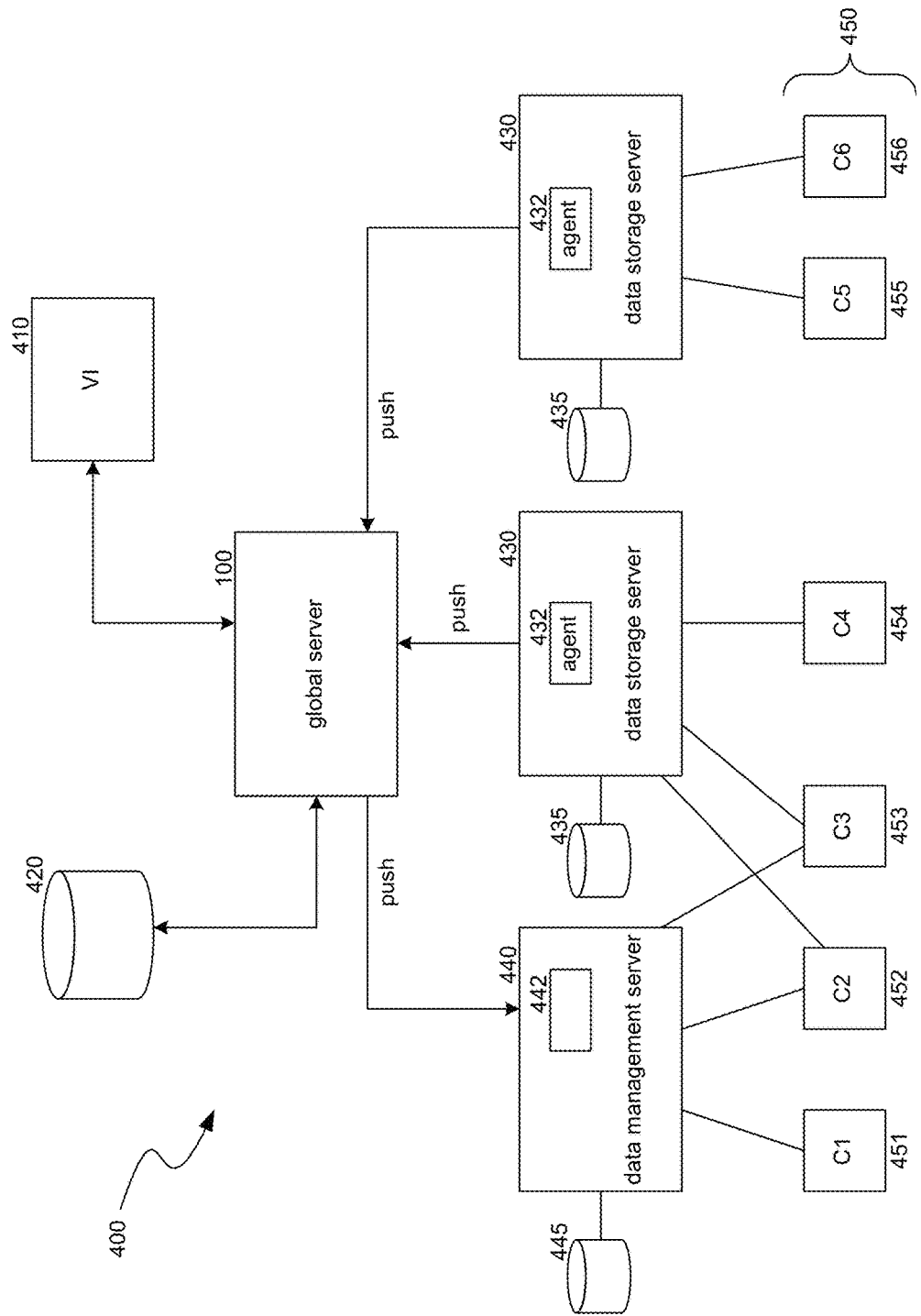
FIG. 4 is a block diagram that illustrates interaction between a global cell and data storage cells.

Referring to FIG. 4, a block diagram illustrating interaction between the global cell and data storage cells is shown. Global server 100, which may contain global load components, global filter components, and other components configured to determine actions based on received data storage information, may communicate with a database 420 and a user interface 410. Database 420 may store storage policies, schedule policies, received sample data, other storage operation information, and so on. User interface 410 may display system information to a user. Further details with respect to the user interface display are discussed below.

Global server 100 may push data to a management server 442. Server 442 communicates with a database 445 and clients 451, 452 and/or 453. Data storage servers 430 push data to the global server 100, and contain data agents 432 and can communicate with databases 435. These servers may communicate with clients 454, 455, and/or 456.

Global server 100 can be configured to perform actions (such as redistributing storage operations), and apply these actions to the data storage system via a management server. Global server 100 receives information used to determine the actions from the storage servers 430. In this example, the global server acts as a hub in the data storage system by sending information to modify data storage operations and monitoring the data storage operations to determine how to improve the operations.

Index Searching

The hierarchical storage system described herein can be used for searching multiple indices of content, retrieving the identified data in accordance with integrated data security policies, and applying the search criteria as a data management policy. Some or all of these functions can be performed via a simple interface accessed, e.g., from a web browser.

The content indices searched can be created by a content indexing system. Indices of this data can be created using any known technique including those described in the assignee's co-pending application Ser. No. 11/694,869 filed Mar. 30, 2007, entitled "Method and System for Offline Indexing of Content and Classifying Stored Data", the contents of which are herein incorporated by reference.

The content indexing system can create an index of an organization's content by examining files generated from routine secondary copy operations performed by the organization. The content indexing system can index content from current secondary copies of the system as well as older copies that contain data that may no longer be available on the organization's network. For example, the organization may have secondary copies dating back several years that contain older data that is no longer available, but may still be relevant to the organization. The content indexing system may associate additional properties with data that are not part of traditional indexing of content, such as the time the content was last available or user attributes associated with the content. For example, user attributes such as a project name with which a data file is associated may be stored.

Members of the organization can search the created index to locate content on a secondary storage device that is no longer online. For example, a user can search for content related to a project that was cancelled a year ago. In this way, content indexing is not affected by the availability of the system that is the original source of the content and users can find additional organization data that is not available in traditional content indexing systems.

In some embodiments, members of the organization can search for content within the organization independent of the content's source through a single, unified user interface, which may be available thorough a web browser. For example, members may search for content that originated on a variety of computer systems within the organization. Members may also search through any copy of the content including any primary, secondary, and/or tertiary or auxiliary copies of the content.

In some embodiments, the content indexing system searches for content based on availability information related to the content. For example, a user may search for content available during a specified time period, such as email received during a particular month. A user may also search specifically for content that is no longer available, such as searching for files deleted from the user's primary computer system. The user may perform a search based on the attributes described above, such as a search based on the time an item was deleted or based on a project with which the item was associated. A user may also search based on keywords associated with user attributes, such as searching for files that only an executive of the organization would have access to, or searching for files tagged as confidential.

Figure 5:
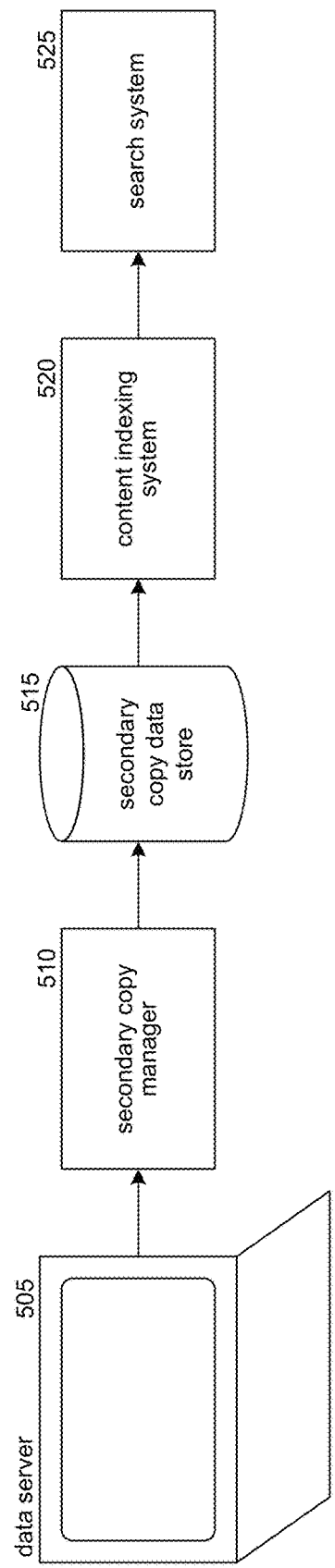
FIG. 5 is a block diagram that illustrates flow of data through the system.

FIG. 5 is a block diagram that illustrates the procedural flow of data, in one embodiment. Content is initially stored on a data server 505 that may be a user computer, data warehouse server, or other information store accessible via a network. The data is accessed by a secondary copy manager 510 to perform a regular copy of the data. Secondary copies of data are stored in a secondary copy data store 515 such as a network attached storage device or secondary copy server. The secondary copy data store 515 provides the data to the content indexing system 520 to perform the functions described above. As illustrated in the diagram, because the content indexing system 520 works with a copy of the data, the original data server 505 is not negatively impacted by the operations of the content indexing system 520. Search system 525 can operate on the data in the content indexing system 520 to provide search functionality for the data having been stored in the secondary copy data store 515.

Figure 6:
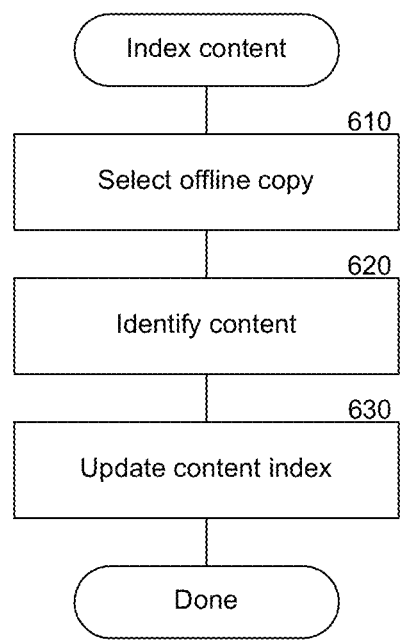
FIG. 6 is a flow diagram that illustrates processing of a content indexing component of the system.
Figure 7:
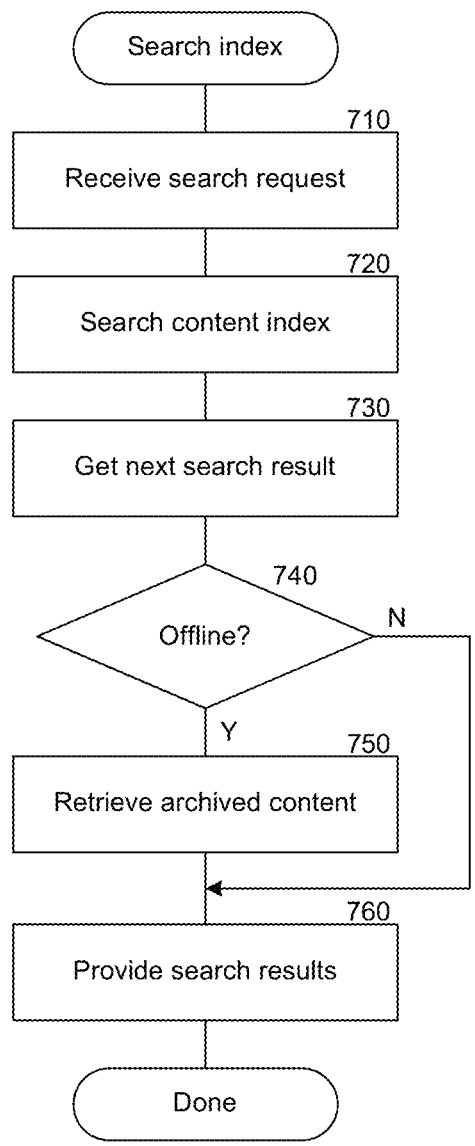
FIG. 7 is a flow diagram that illustrates processing of an index searching component of the system.

FIGS. 6-7 are representative flow diagrams that depict processes used in some embodiments. These flow diagrams do not show all functions or exchanges of data, but instead they provide an understanding of commands and data exchanged under the system. Those skilled in the relevant art will recognize that some functions or exchange of commands and data may be repeated, varied, omitted, or supplemented, and other (less important) aspects not shown may be readily implemented.

FIG. 6 is a flow diagram that illustrates the processing of a content indexing component for later searching, according to one embodiment. The component is invoked when new content is available or additional content is ready to be added to the content index. In step 610, the component selects a copy of the data to be indexed. For example, the copy may be a secondary copy of the data or a data snapshot. In step 620, the component identifies content within the copy of the data. For example, the component may identify data files such as word processing documents, spreadsheets, and presentation slides within the secondary data store. In step 630, the component updates an index of content to make the content available for searching. For example, the component may add information such as the location of the content, keywords found within the content, and other supplemental information about the content that may be helpful for locating the content during a search. After step 630, these steps conclude.

FIG. 7 is a flow diagram that illustrates the processing of an index searching component of the system, in one embodiment. In step 710, the component receives a search request specifying criteria for finding matching target content. For example, the search request may specify one or more keywords that will be found in matching documents. The search request may also specify boolean operators, regular expressions, and other common search parameters to identify relationships and precedence between terms within the search query. The search request may also specify data stores to be searched. The request may specify that the search is to include one or more of an original copy, a primary secondary copy, and secondary or auxiliary copies of the content. As described in more detail below, in some embodiments, a user may be provided with an interface by which to select one or more classes of data stores for search. In some embodiments, an interface may be provided by which a user can specify a security clearance and corresponding operators. For example, a user could form a search query for all documents on a certain class of data store having medium security or higher clearance.

In step 720, the component searches the content index to identify matching content items that are added to a set of search results. For example, the component may identify documents containing specified keywords or other criteria and add these to a list of search results. In step 730, the component selects a first or next search result. In decision step 740, if the search results indicate that the identified content is offline, then the component continues at step 750, else the component continues at step 760. For example, the content may be offline because it is on a tape that has been sent to an offsite storage location. In step 740, the component retrieves the archived content. Additionally or alternatively, the component may provide an estimate of the time required to retrieve the archived content and add this information to the selected search result. In step 760 the component provides the search results in response to the search query. For example, the user may receive the search results through a web browser interface that lists the search results or the search results may be provided to another component for additional processing through an application programming interface (API). After step 760, these steps conclude.

Federated Search

The search described herein can include indices of data, where the data is a snapshot, primary copy, secondary copy, auxiliary copy, and so on. An organization may have several copies of data available on different types of media. Data may be available on, for example, a tape, on a secondary copy server, or through network attached storage.

The search capability can be extended to handle an end-user based search via a web interface, a user-based search (e.g., all files that can belong to "Bob" or that can be viewed by "Bob"), search results across several application types (e.g., file copies, Microsoft Exchange mailbox copies, Microsoft Exchange data agents, Microsoft Exchange public folders, etc.) and search results across multiple computers.

Figure 8:
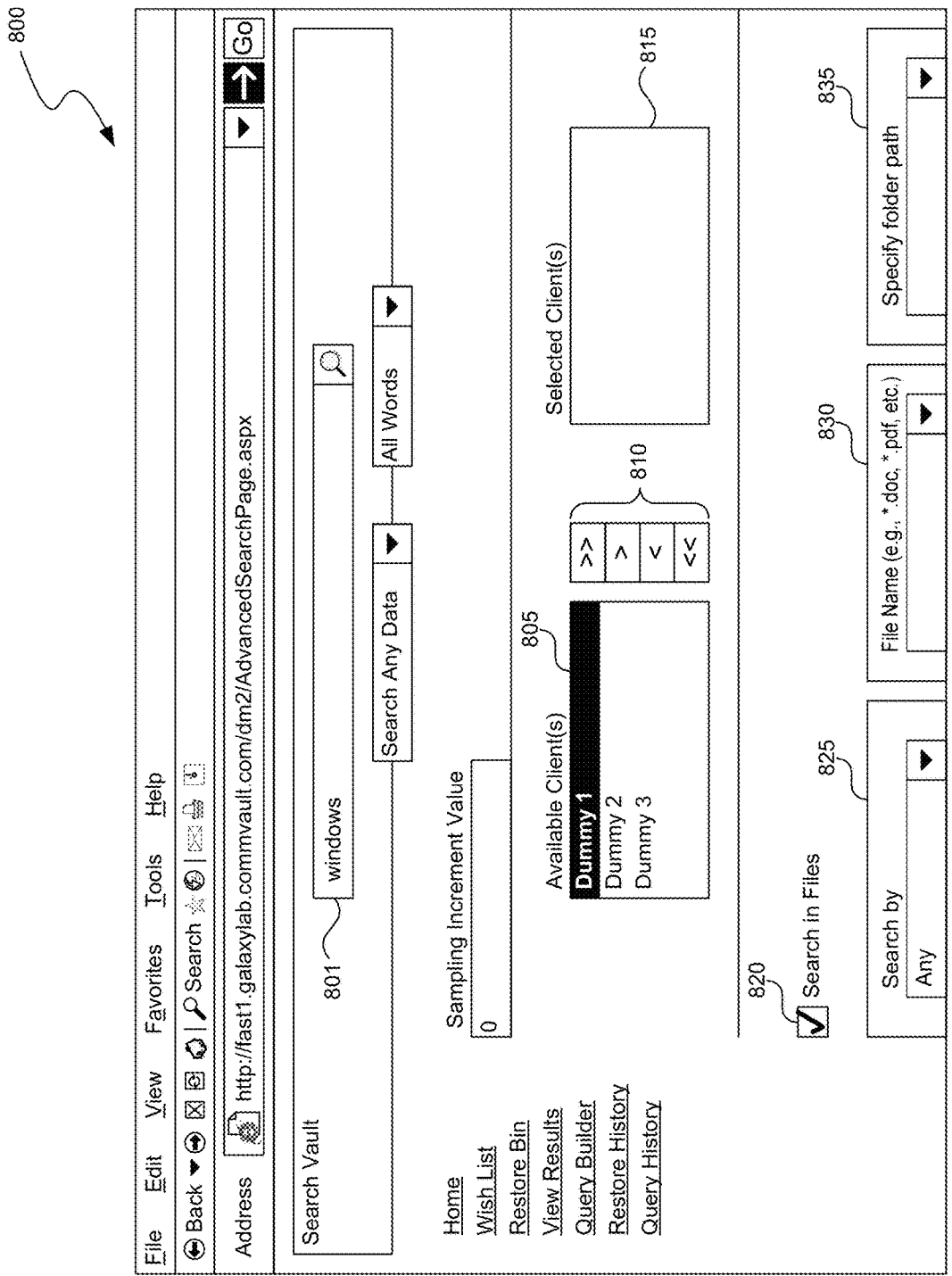
FIG. 8 illustrates a client selection interface for searching.

Using a graphical user interface, search criteria can be provided to specify data that is stored on any number and type of volumes and any type of data. An interface such as the interface 800 illustrated in FIG. 8 can be used to specify a search term 801 and one or more clients or volumes to search. As illustrated in FIG. 8, a list of available clients 805 can be presented. A set of controls 810 can be used to select one or more of the available clients. Selected clients can be displayed in region 815. Variations on this embodiment of the interface can be used to allow a user to select various volumes for the search. For example, the interface can allow a user to specify that the search is to be over the original copy, a primary secondary copy, and secondary or auxiliary copies of the content. The interface can also be configured to allow the user to specify that the search is to include file contents. An exemplary interface for allowing this option and receiving additional related parameters from a user can include an enabling check box 820 for searching in files, a search by field 825, a file name field 830, and a folder path 835 field.

Figure 9:
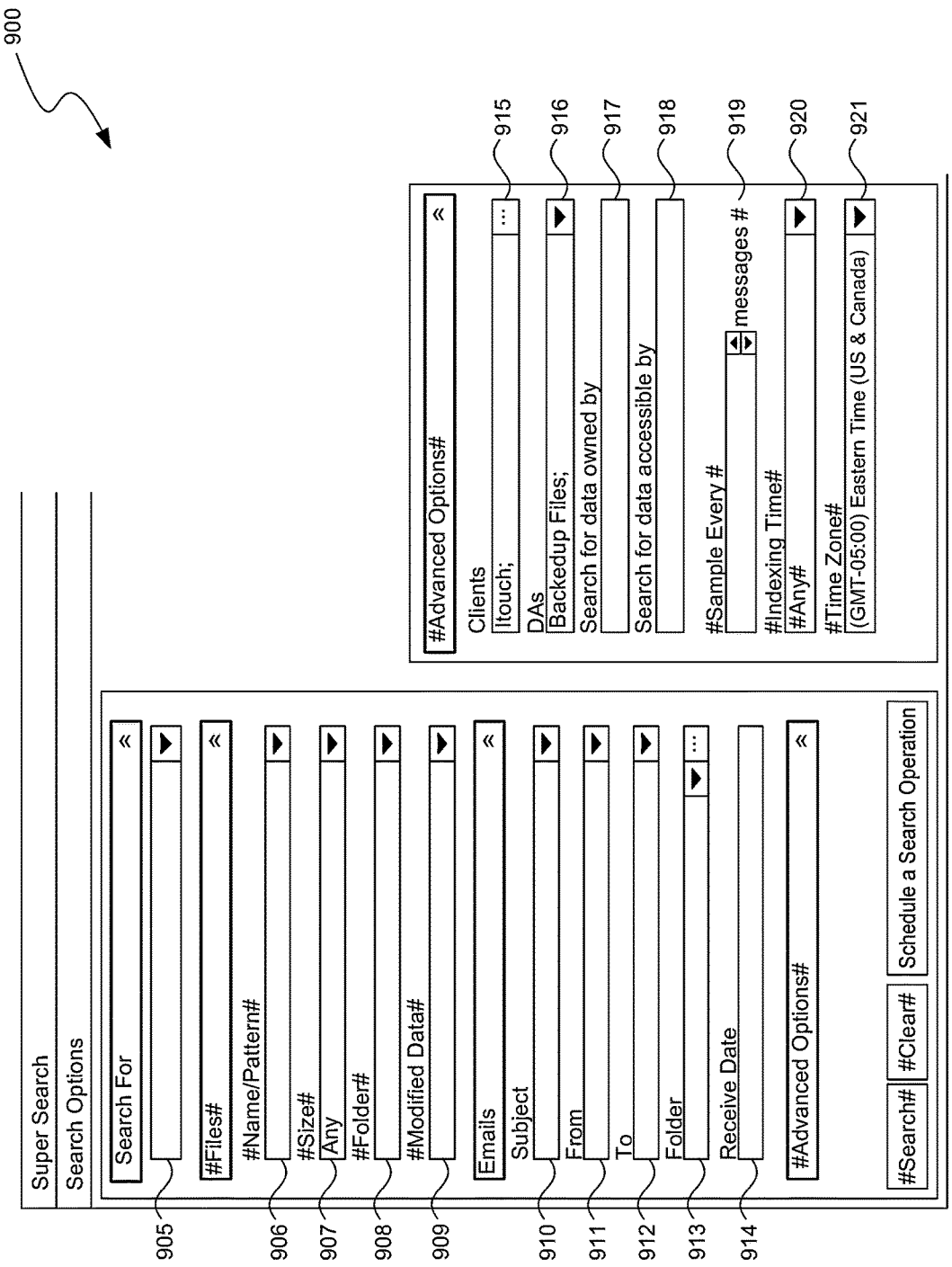
FIG. 9 illustrates a query construction interface for searching.

The search criteria can also specify that the data be from any of multiple applications or of any type. An example of an interface for receiving additional search parameters is shown in FIG. 9. The search interface 900 can include fields for a search term 905, file name 906, file size 907, folder 908, modification date 909, email subject 910, email sender 911, email recipient 912, folder 913, date of receipt 914, and various advanced options such as client 915, iDA 916, owner 917, accessibility 918, sample 919, indexing time 920, and time zone 921.

Through the same interface or a separate interface, the user can also select the various types of application data to be searched. The graphical interface for performing the search can provide an efficient means for a user to enter search terms and perform that search over multiple volumes and data types. For example, the interface can provide check boxes or other population routines for identifying hardware or resources and display the list whereby a user can select specific volumes by name or address or whereby a user can select volumes by type or classification. Similarly, a user may be prompted to specify data types or classes.

In some embodiments, the search performed over multiple secondary copies and physical devices will be made with reference to metadata stored in one or more metabases or other forms of databases. A data collection agent may traverse a network file system and obtain certain characteristics and other attributes of data in the system. In some embodiments, such a database may be a collection of metadata and/or other information regarding the network data and may be referred to herein as a metabase. Generally, metadata refers to data or information about data, and may include, for example, data relating to storage operations or storage management, such as data locations, storage management components associated with data, storage devices used in performing storage operations, index data, data application type, or other data. Operations can be performed on this data using any known technique including those described in the assignee's co-pending application Ser. No. 11/564,119 filed Nov. 28, 2006, now U.S. Pat. No. 7,668,884, entitled "Systems and Methods for Classifying and Transferring Information in a Storage Network" the contents of which are herein incorporated by reference.

With this arrangement, when a search over multiple secondary copies is to be performed, a system administrator or system process may simply consult the metabase for such information rather than iteratively access and analyze each data item in the network. This approach significantly reduces the amount of time required to obtain data object information by substantially reducing or eliminating the need to obtain information from the source data, and furthermore reduces or minimizes the involvement of network resources in this process, thereby reducing the processing burden on the host system.

In some embodiments, a query may be received by the system for certain information. This request may be processed and analyzed by a manager module or other system process that determines or otherwise identifies which metabase or metabases within the system likely include at least some of the requested information. For example, the query itself may suggest which metabases to search and/or the management module may consult an index that contains information regarding metabase content within the system. The identification process may include searching and identifying multiple computing devices within an enterprise or network that may contain information satisfying search criteria.

A processor can be configured to search metabases or other indices corresponding to multiple volumes and data stores to identify an appropriate data set that may potentially have information related to the query. This may involve performing iterative searches that examine results generated by previous searches and subsequently searching additional, previously unidentified metabases to find responsive information that may not have been found during the initial search. Thus, the initial metabase search may serve as a starting point for searching tasks that may be expanded based on returned or collected results. The returned results may be optionally analyzed for relevance, arranged, and placed in a format suitable for subsequent use (e.g., with another application), or suitable for viewing by a user and reported.

Figure 10:
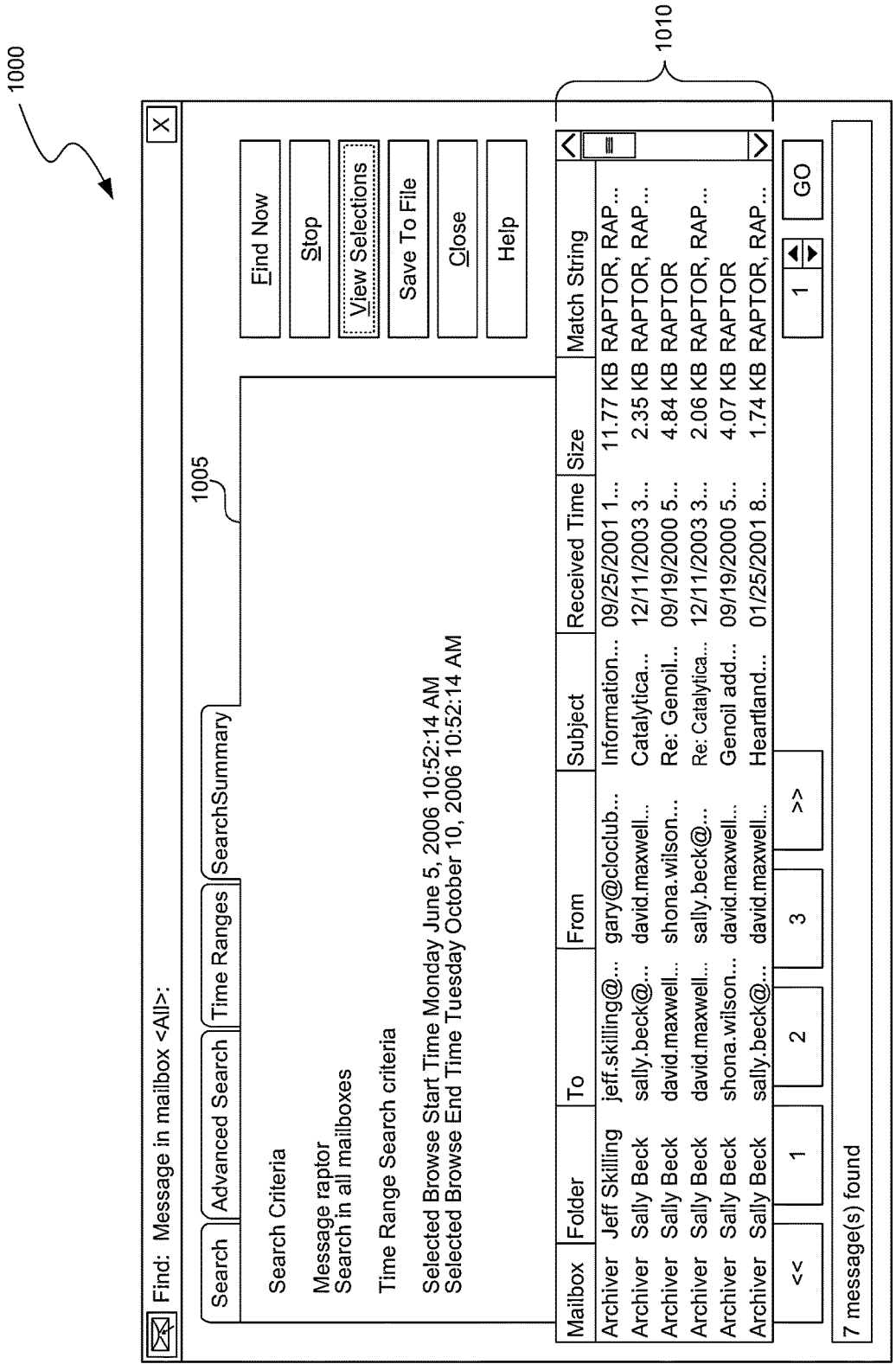
FIG. 10 illustrates a search summary.

Once a search has been performed and at least one document or other discrete data item identified, a list of the identified documents or data items can be provided. An example interface 1000 for displaying the results of an email search is illustrated in FIG. 10. The interface 1000 can include a summary area 1005 with summary information as well as a search results section 1010.

In some further embodiments, the one or more identified documents can be retrieved without performing a restore of the data back to the production volume. Such a transfer may involve copying data objects and metadata from one data store and metabase to another, or in some embodiments, may involve migrating the data from its original location to a second location and leaving a pointer or other reference to the second location so the moved information may be quickly located from information present at the original location.

Figure 11:
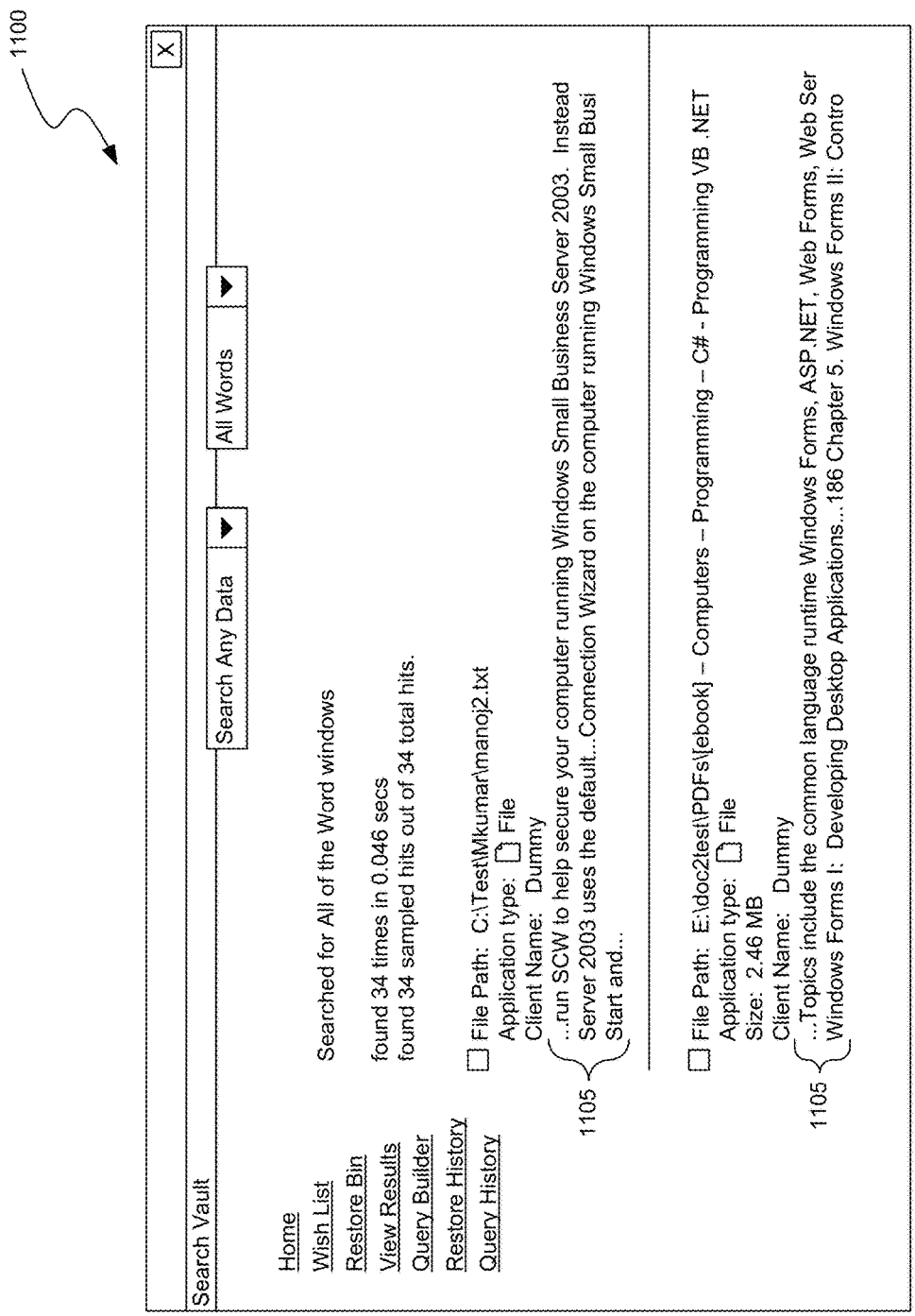
FIG. 11 illustrates a results display in an interface for searching.

In some embodiments, a preview pane can be provided so that a user can view at least a portion of the contents of the identified file. One such preview pane 1100 is illustrated in FIG. 11. This preview can be provided before any restore or retrieve operation is executed. In some embodiments, the preview can be generated by reading the identified file from the original data store and displaying the contents on the screen. In other embodiments, the identified file can be copied to a local disk and the preview generated based on file as it resides on a local disk. In some embodiments, the interface can display a portion of content 1105 from the data file returned by the search query and, in some further embodiments, prompt a user to refine the search. Data retrieval can also be performed using any known technique including those described in the assignee's co-pending application Ser. No. 11/694,890 filed Mar. 30, 2007, now U.S. Pat. No. 7,734,669, entitled "System and Method for Data Retrieval, Including Secondary Copy Precedence Optimizations", the contents of which are herein incorporated by reference.

Data Management Policy Integration

In some embodiments, the search criteria provided by a user as part of a search can later be applied as a data management policy. For example, a user could develop search terms that identify a certain set of data files. These search terms can then be stored as a data management policy which can then be applied at any other point in the data storage system. A data management policy created in this manner can be a data structure or other information source that includes a set of preferences and other storage criteria associated with performing a storage operation. The data management policy created based on a user-supplied search criteria can also be used as part of a schedule policy.

A schedule policy may specify when to perform storage operations and how often, and may also specify performing certain storage operations on sub-clients of data and how to treat those sub-clients. A sub-client may represent static or dynamic associations of portions of data of a volume and are typically mutually exclusive. Thus, a portion of data may be given a label and the association is stored as a static entity in an index, database or other storage location used by the system. Sub-clients may also be used as an effective administrative scheme of organizing data according to data type, department within the enterprise, storage preferences, etc. The search criteria provided by a user can be used as a file selector in connection with any schedule policy.

In some embodiments, the data management policy can include various storage preferences, for example, those expressed by a user preference or storage policy. As non-limiting examples, the data management policy can specify a storage location, relationships between system components, network pathway to utilize, retention policies, data characteristics, compression or encryption requirements, preferred system components to utilize in a storage operation, and other criteria relating to a storage operation. Thus, a storage policy may indicate that certain data is to be stored in a specific storage device, retained for a specified period of time before being aged to another tier of secondary storage, copied to secondary storage using a specified number of streams, etc. A storage policy and/or a schedule policy may be stored in a storage manager database or in other locations or components of the system.

Integrated Data Rights Security Control

Some organizations may have multiple levels of security according to which some users can access certain files while others cannot. For example, a high security user group can be defined and this group can be granted access to all documents created by the organization; a medium security group can be granted access to only certain classes of documents; a low security group can be granted access only to certain predefined documents.

The search interface described herein can be configured to be accessible by any type of user including a secondary copy administrator, an end user who does not have any administrative privileges, or a user of any security clearance. Additionally, the data files stored in the data management system can tagged with security information. This information tag can be stored in a metabase or any other form of content index and can be used to leverage existing security schema. In embodiments in which a search is performed on one or more context indices, corresponding security tag information can be stored therein. Security information can include identification of various classes of users who are granted rights to access the document as well as identification of classes of users who are denied access rights.

In some embodiments, security information can be stored in the form of user tags. User tags are further described in the assignee's co-pending application Ser. No. 11/694,784 filed Mar. 30, 2007, entitled "System and Method Regarding Security And Permissions", the contents of which are herein incorporated by reference.

In some further embodiments, the search results can be filtered based on the user's security clearance or access privileges. After a user enters search parameters, data files matching those parameters may be identified, and a list of the identified files displayed to the user. If the user does not have the required security clearance or access privileges, the interface can be configured not to display the file.

It is possible that a secondary copy administrator may not have sufficient security clearance to inspect a file that is being restored or retrieved. In such a circumstance, the administrator will not be allowed to preview the file or otherwise inspect the contents of it during the search process. The interface providing results may be configured to not display a preview of such a file. If a secondary copy administrator had sufficient security clearance, then a preview may be provided or the administrator may be allowed to make a local copy of the file.

If the secondary copy administrator does not have sufficient security clearance for a specific file or group or class of files, an interface may be provided through which the administrator may initiate a copy of that file directly from the secondary copy device to a directory or disk associated with a user who has sufficient security clearance. In some instances, the user associated with the file may be the owner of the file. If the secondary copy administrator or other user executing a search query has sufficient security clearance to inspect the contents of the one or more files identified in the search, a preview of the data file may be displayed.

System Embodiments

The following discussion provides a brief, general description of a suitable computing environment in which the invention can be implemented. Although not required, aspects of the invention are described in the general context of computer-executable instructions, such as routines executed by a general-purpose computer, e.g., a server computer, wireless device or personal computer. Those skilled in the relevant art will appreciate that the invention can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "host," and "host computer" are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. Aspects of the invention can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the invention may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the invention reside on a server computer, while corresponding portions reside on a client computer such as a mobile or portable device, and thus, while certain hardware platforms are described herein, aspects of the invention are equally applicable to nodes on a network.

CONCLUSION

From the foregoing, it will be appreciated that specific embodiments of the system have been described herein for purposes of illustration, but that various modifications may be made without deviating from the spirit and scope of the invention. For example, although files have been described, other types of content such as user settings, application data, emails, and other data objects can all be indexed by the system. Accordingly, the invention is not limited except as by the appended claims.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

These and other changes can be made to the invention in light of the above Detailed Description. While the above description details certain embodiments of the invention and describes the best mode contemplated, no matter how detailed the above appears in text, the invention can be practiced in many ways. Details of the system may vary considerably in implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

We claim:

1. A method for managing data associated with a data storage device, wherein the data storage device is coupled to multiple computers over a network, the method comprising:
   providing a user interface that accesses an index of data associated with the data storage device,
      wherein the user interface indicates that application data from the data storage device has been moved to an offsite location and is not accessible to the multiple computers over the network, and
      wherein the index has been updated to indicate the application data has moved to the offsite location;
   receiving, at the user interface, a query from a user,
      wherein the query includes at least one search parameter; and
      wherein the query is used to search the index of data associated with the data storage device for application data that matches the at least one received search parameter,
   providing to the user, via the user interface, information that identifies the application data at the offsite location matches the at least one search parameter of the query;
   receiving data for creating a data storage policy that specifies one or more data storage operations to be performed on the stored application data,
      wherein the data storage policy is created in part based on results obtained from the searching of the index,
      wherein the searching accesses the information and identifies matching application data from multiple computers and in multiple formats, and
      wherein the data storage policy is a data structure that includes a set of criteria used to perform storage operations; and,
   causing one or more data storage operations to be performed on the stored application data based on the data storage policy and based on the results obtained from the searching of the index.

2. The method of claim 1, wherein application data received from multiple computers over the network is stored in the data storage device, wherein the application data comprises data in multiple formats, wherein each format corresponds to a different software format.

3. The method of claim 1, further comprising storing the at least one received search parameter as a new data storage policy, wherein the new data storage policy comprises a set of preferences or storage criteria associated with performing future storage operations.

4. The method of claim 3, wherein the new data storage policy is associated with a scheduling component and defines when the scheduling component should perform a storage operation and how often to perform the storage operation.

5. The method of claim 3, wherein the new data storage policy is stored in a storage manager, the storage manager further comprising a jobs agent configured to carry out data storage operations, a management agent configured to monitor the status of the data storage operations, and an interface module configured to display the status of the data storage operations to a user.

6. The method of claim 1, further comprising providing the query from the user across the network via a web browser, wherein the searching identifies data stored across multiple data storage tiers in the network matching the at least one search parameter.

7. The method of claim 1, further comprising displaying one or more documents that match the at least one search parameter and providing access to one or more identified documents without overwriting a current copy of the one or more identified documents on the data storage component.

8. A non-transitory computer-readable medium whose contents, when executed by a computing system, cause the computing system to perform a method for managing data associated with a data storage device, wherein the data storage device is coupled to multiple computers over a network, the method comprising:
   providing a user interface that accesses an index of data associated with the data storage device,
      wherein the user interface indicates that application data from the data storage device has been moved to an offsite location and is not accessible to the multiple computers over the network, and
      wherein the index has been updated to indicate the application data has moved to the offsite location;
   receiving, at the user interface, a query from a user,
      wherein the query includes at least one search parameter;
      wherein the query is used to search the index of data associated with the data storage device for application data that matches the at least one received search parameter, and
      wherein the search of the index of data identifies matching application data from multiple computers and in multiple formats;
   providing to the user, via the user interface, information that identifies the application data at the offsite location matches the at least one search parameter of the query;
      wherein the searching identifies matching application data from multiple computers and in multiple formats; and
   causing one or more data storage operations to be performed on the stored application data based on the results obtained from the searching of the index of data.

9. The non-transitory computer-readable medium of claim 8, wherein application data received from multiple computers over the network is stored in the data storage device, wherein the application data comprises data in multiple formats, wherein each format corresponds to a different software format.

10. The non-transitory computer-readable medium of claim 8, further comprising storing the at least one received search parameter as a new data storage policy, wherein the new data storage policy comprises a set of preferences or storage criteria associated with performing future storage operations.

11. The non-transitory computer-readable medium of claim 10, wherein the new data storage policy is associated with a scheduling component and defines when the scheduling component should perform a storage operation and how often to perform the storage operation.

12. The non-transitory computer-readable medium of claim 10, wherein the new data storage policy is stored in a storage manager, the storage manager further comprising a jobs agent configured to carry out data storage operations, a management agent configured to monitor the status of the data storage operations, and an interface module configured to display the status of the data storage operations to a user.

13. The non-transitory computer-readable medium of claim 8, further comprising providing the query from the user across the network via a web browser, wherein the searching identifies data stored across multiple data storage tiers in the network matching the at least one search parameter.

14. The non-transitory computer-readable medium of claim 8, further comprising displaying one or more documents that match the at least one search parameter and providing access to one or more identified documents without overwriting a current copy of the one or more identified documents on the data storage component.

15. A system, comprising:
   at least one processor;
   at least one non-transitory computer-readable medium coupled to the at least one processor and storing instructions for implementing a process to manage data associated with a data storage device, wherein the process comprises:
      providing a user interface that accesses an index of data associated with the data storage device,
         wherein the user interface indicates that application data from the data storage device has been moved to an offsite location and is not accessible to the multiple computers over the network, and
      receiving, at the user interface, a query from a user,
         wherein the query includes at least one search parameter;
         wherein the query is used to search the index of data associated with the data storage device for application data that matches the at least one received search parameter, and
         wherein the search of the index of data includes a search for data associated with multiple different applications, multiple different secondary copies, and multiple offline copies of the application data;
      providing to the user, via the user interface, information that identifies the application data at the offsite location matches the at least one search parameter of the query; and
      causing one or more data storage operations to be performed on the stored application data based on the results obtained from the searching of the index of data.

16. The system of claim 15, wherein application data received from multiple computers over the network is stored in the data storage device, wherein the application data comprises data in multiple formats, wherein each format corresponds to a different software format.

17. The system of claim 15, further comprising storing the at least one received search parameter as a new data storage policy, wherein the new data storage policy comprises a set of preferences or storage criteria associated with performing future storage operations.

18. The system of claim 17, wherein the new data storage policy is associated with a scheduling component and defines when the scheduling component should perform a storage operation and how often to perform the storage operation.

19. The system of claim 17, wherein the new data storage policy is stored in a storage manager, the storage manager further comprising a jobs agent configured to carry out data storage operations, a management agent configured to monitor the status of the data storage operations, and an interface module configured to display the status of the data storage operations to a user.

20. The system of claim 15, further comprising providing the query from the user across the network via a web browser, wherein the searching identifies data stored across multiple data storage tiers in the network matching the at least one search parameter.

21. The system of claim 15, further comprising displaying one or more documents that match the at least one search parameter and providing access to one or more identified documents without overwriting a current copy of the one or more identified documents on the data storage component.

* * * * *